United States Patent [19]

Martin

[11] 3,998,094

[45] Dec. 21, 1976

[54] METHOD OF AND APPARATUS FOR MEASURING THE DISTANCE PER AMOUNT OF FUEL CONSUMED BY A VEHICLE

[75] Inventor: Barrie James Martin, Shenfield, England

[73] Assignee: Plessey Handel und Investments AG, Zug, Switzerland

[22] Filed: July 31, 1975

[21] Appl. No.: 600,923

[30] Foreign Application Priority Data

Aug. 10, 1974 United Kingdom ............ 35317/74

[52] U.S. Cl. .................................... 73/114; 73/113
[51] Int. Cl.² ......................................... G01L 3/26
[58] Field of Search ............................. 73/114, 113

[56] References Cited

UNITED STATES PATENTS

| | | | |
|---|---|---|---|
| 2,297,435 | 9/1942 | Schwager | 73/113 |
| 3,537,302 | 11/1970 | Marek et al. | 73/114 |
| 3,549,868 | 12/1970 | Watson et al. | 73/114 |
| 3,908,451 | 9/1975 | Walker et al. | 73/114 |

Primary Examiner—James J. Gill
Assistant Examiner—Anthony V. Ciarlante
Attorney, Agent, or Firm—Fleit & Jacobson

[57] ABSTRACT

A method of measuring the distance per amount of fuel that is being consumed by an engine of a vehicle at any one instant, which method comprises measuring the fuel flow rate to the engine of the vehicle, measuring the vehicle speed, and dividing the vehicle speed by the vehicle fuel flow rate, the method being such that the fuel for the engine is injected through a fuel injection nozzle which is opened for fuel injection by providing the injection nozzle with electrical pulses during periods in which the fuel is to be fed to the engine, and the method also being such that the fuel flow rate is measured by measuring and multiplying together the time that the injection nozzle is open for fuel injection and the repetition time of the pulses.

8 Claims, 2 Drawing Figures

METHOD OF AND APPARATUS FOR MEASURING THE DISTANCE PER AMOUNT OF FUEL CONSUMED BY A VEHICLE

This invention relates to a method of measuring the distance per amount of fuel that is being consumed by a vehicle at any instant. This invention also relates to apparatus for measuring the distance per amount of fuel that is being consumed by a vehicle at any instant. Usually the vehicle will be a land vehicle and then the distance per amount of fuel measured will be miles per gallon measured or kilometers per liter.

This invention provides a method of measuring the distance per amount of fuel that is being consumed by an engine of a vehicle at any one instant, which method comprises measuring the fuel flow rate to the engine of the vehicle, measuring the vehicle speed, and dividing the vehicle speed by the vehicle fuel flow rate, the method being such that the fuel for the engine is injected through a fuel injection nozzle which is opened for fuel injection by providing the injection nozzle with electrical pulses during periods in which the fuel is to be fed to the engine, and the method also being such that the fuel flow rate is measured by measuring and multiplying together the time that the injection nozzle is open for fuel injection and the repetition time of the pulses.

Preferably, the method of the invention is such that a plurality of pulses are fed to the injection nozzle during each period in which the fuel is to be fed to the engine, the pulses being effective to vibrate the injection nozzle. The vibration of the injection nozzle may be effected by applying the pulses to a piezoelectric crystal. In cases where it is not desired to vibrate the injection nozzle, then the injection nozzle may be provided with a solenoid operated device which on receipt of an electrical pulse, is effective to open the injection nozzle.

Preferably, the method of the invention additionally comprises integrating the flow rate with respect to time to give the amount of fuel used by the vehicle, e.g. gallons or liters.

This invention also provides apparatus for measuring the distance per amount of fuel that is being consumed by an engine of a vehicle at any one instant, which apparatus comprises fuel flow rate measuring means for measuring the fuel flow rate to the engine, vehicle speed measuring means for measuring the vehicle speed, divider means for dividing the vehicle road speed by the vehicle fuel flow rate, a fuel injection nozzle for injecting the fuel for the engine, and means for providing the injection nozzle with electrical pulses during periods in which the fuel is to be fed to the engine thereby to open the injection nozzle for fuel injection, said apparatus being such that the fuel flow rate measuring means includes means for measuring the time that the injection nozzle is open for fuel injection and the pulse repetition frequency of the injection.

Preferably, the means for providing the injection nozzle with electrical pulses is effective to provide the injection nozzle with a plurality of pulses during each period in which fuel is to be fed to the engine, the pulses being effective to vibrate the engine nozzle.

The fuel flow rate measuring means may comprise means for measuring the time that the injection nozzle is open for fuel injection and the pulse repetition time of the injector. Preferably, the said means includes a multiplier device for multiplying together the two measured values.

The injection nozzle may be fed at constant pressure if desired.

The vehicle speed measuring means may be a sensor or an electronic pick-up device which gives an analogue or digital output signal proportional to the rotation of a part of the engine of the vehicle, e.g. the propeller shaft or the rear axle of a land vehicle. The output signal will thus be a function of vehicle speed.

It will be apparent that the method and apparatus of the invention enable a driver of a vehicle to know when he is driving at the most economical speed because the invention enables the driver to know the distance per amount of fuel that is being consumed by the vehicle at any instant.

An embodiment of the invention will now be described by way of example and with reference to the accompanying drawings in which.

Figure 1:
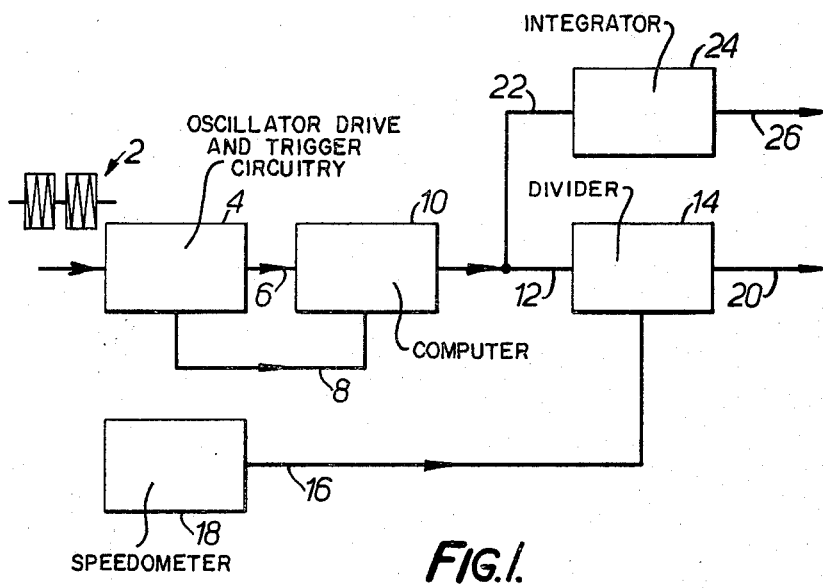
FIG. 1 is a schematic view of apparatus in accordance with the invention.

Referring to FIG. 1, there is shown pulses 2 being fed to a fuel injection nozzle (not shown) and also to oscillator drive and trigger circuitry shown in block diagram at 4. The oscillator drive and trigger circuitry 4 enables a pulse repetition frequency signal to be obtained along line 6 and a pulse length signal to be obtained along line 8. These two signals are fed to a computer 10. Signals from the computer 10 are fuel flow rate signals and these signals pass along line 12 to a divider 14. Vehicle road speed signals pass along a line 16 from a speedometer 18 and are also fed to the divider 14. In the divider 14, the vehicle road speed is divided by the fuel flow rate and a signal indicative of distance per amount of fuel, e.g. miles per gallon, is obtained from the divider 14 in line 20.

The fuel flow rate signals from the computer 10 are also passed along line 22 to an integrator 24 which gives a signal indicative of gallons used along line 26.

Figure 2:
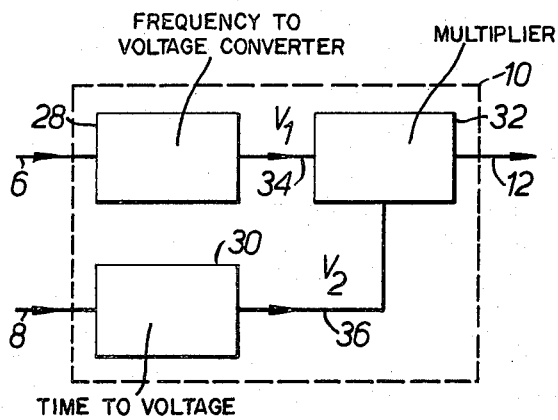
FIG. 2 shows an amplification of the computer section employed in FIG. 1.

Referring now to FIG. 2, there is shown an amplification of the computer 10. More particularly, it will be seen that the computer 10 comprises a frequency to voltage converter 28, a time to voltage converter 30 and a multiplier 32. The pulse repetition frequency signals pass along conduit 6 to the frequency to voltage converter 28 and voltage signals $v_1$ which are proportional to the pulse repetition frequency are produced. These signals $V_1$ pass from the converter 28 along line 34 to the multiplier 32. The pulse length signals pass along line 8 to the time to voltage converter 30 and voltage signals $V_2$ which are proportional to pulse length are produced. These signals $V_2$ pass from the converter 30 along line 36 to the multiplier 32. The signals $V_1$ and $V_2$ are multiplied in the multiplier 32 to give the fuel flow rate in line 12 as indicated above.

A constant is usually subtracted from the value $V_2$ to allow for the start time of the injector.

From the above, there is obtained:

$$V_1 \propto \text{pulse repetition frequency} = \frac{1}{C}$$

(where $C$ = the constant)

$$V_2 \propto \text{pulse length} \propto \text{flow}$$

-continued $$\therefore V_1 \times V_2 = \frac{\text{flow}}{\text{time}}$$

It is to be appreciated that the description of the invention given above with reference to the drawings has been given by way of example only and that modifications may be effected. Thus, for example, the invention illustrated in the drawings has been described with reference to ultrasonic fuel injection systems wherein fuel injection nozzles are fed at constant pressure from a fuel supply. However, if desired, the invention could be applied to a diesel engine having a rack position indicator and an engine speed indicator. Movement of the rack is usually directly proportional to the amount of fuel injected and so measurement of rack movement gives an indication of fuel injected. In another modification of the illustrated embodiment of the invention, the integrator 24 can be omitted so that the gallons used by the engine are not shown.

What we claim is:

1. A method of measuring the distance per amount of fuel that is being consumed by an engine of a vehicle at any one instant, which method comprises measuring the fuel flow rate to the engine of the vehicle, measuring the vehicle speed, and dividing the vehicle speed by the vehicle fuel flow rate, the method being such that the fuel for the engine is injected through a fuel injection nozzle which is opened for fuel injection by providing the injection nozzle with electrical pulses during periods in which the fuel is to be fed to the engine, and the method also being such that the fuel flow rate is measured by measuring and multiplying together the time that the injection nozzle is open for fuel injection and the repetition time of the pulses.

2. A method according to claim 1 in which a plurality of pulses are fed to the injection nozzle during each period in which fuel is to be fed to the engine, the pulses being effective to vibrate the injection nozzle.

3. Apparatus for measuring the distance per amount of fuel that is being consumed by an engine of a vehicle at any one instant, which apparatus comprises fuel flow rate measuring means for measuring the fuel flow rate to the engine, vehicle speed measuring means for measuring the vehicle speed, divider means for dividing the vehicle road speed by the vehicle fuel flow rate, a fuel injection nozzle for injecting the fuel for the engine, and means for providing the injection nozzle with electrical pulses during periods in which the fuel is to be fed to the engine thereby to open the injection nozzle for fuel injection, said apparatus being such that the fuel flow rate measuring means includes means for measuring the time that the injection nozzle is open for fuel injection and the pulse repetition frequency of the injection.

4. Apparatus according to claim 3 in which the fuel flow rate measuring means includes a multiplier device for multiplying together the time that the injection nozzle is open for fuel injection and the pulse repetition frequency of the injection.

5. Apparatus according to claim 3 in which the fuel flow rate measuring means is comprised by oscillator drive and trigger circuitry.

6. Apparatus according to claim 3 in which the vehicle speed measuring means gives an analogue output proportional to the rotation of a part of the engine of the vehicle.

7. Apparatus according to claim 3 in which the vehicle speed measuring means gives a digital output proportional to the rotation of a part of the engine of the vehicle.

8. Apparatus according to claim 3 in which the means for providing the injection nozzle with electrical pulses is effective to provide the injection nozzle with a plurality of pulses during each period in which fuel is to be fed to the engine, the pulses being effective to vibrate the injection nozzle.

* * * * *